Patented Oct. 31, 1933

1,933,435

UNITED STATES PATENT OFFICE 1,933,435

METHOD OF CARRYING OUT CATALYTIC HYDROGENATION

Hans Kaffer, Duisburg-Meiderich, Germany

No Drawing. Application December 20, 1928, Serial No. 327,483, and in Germany December 23, 1927

2 Claims. (Cl. 260—168)

Since the basic experiments by Sabatier and Senderens, there have been numerous cases of catalytic hydrogenation, both in scientific work and on a large commercial scale, in which certain metals or their compounds have been used as catalysts. In many instances also, these latter, for the purpose of finer distribution, have been precipitated on bodies with a large surface, such as asbestos, kieselguhr, active charcoal and the like, in which case however the last-mentioned bodies merely played the part of catalyst carriers. The characteristic common to all these hydrogenations is moreover, that if they are to be carried out economically, the initial substances require a careful preliminary purification, to free them from catalyst poisons, such as for instance halogens, phosphorus, arsenic and more especially sulphur.

It has been found that in the hydrogenation of hydrocarbons and hydrocarbon mixtures, other than splitting or cracking hydrogenation use can be made, as an excellent, non-metallic catalyst, of the so-called residual coal, which remains as an unattackable, unhydrogenatable, undistillable residue, insoluble in organic solvents, after the destructive pressure hydrogenation of coals of all kinds by the Bergius process. It is immaterial whether this residual coal is used in the process provided by the invention in the unchanged form in which it is obtained, for instance on filtration from the liquid portion of the berginized material, or in a further purified state, for instance after extraction with organic solvents, acids and the like.

In the presence of these residual coals, hydrocarbons of all kinds or mixtures of hydrocarbons for instance are converted by hydrogen under pressure and at increased temperatures of about 350-425° C. into their true hydrogenation products, and, what is particularly noteworthy, without it being necessary to free them before hydrogenation by purification from catalyst poisons or small foreign admixtures, such as phenols, bases, unsaturated compounds and the like.

It has already been proposed in the splitting of coals, tar distillates, mineral oils etc., which takes place under pressure in the presence of hydrogen, as well as in the conversion of naphthenes and other compounds rich in hydrogen, into aromatic hydrocarbons by dehydrogenation, and finally in the stabilization of natural or artificial oils, to add porous or active charcoals as reaction accelerators for the reacting substances. The behaviour of the residual coals in the cases in which it is a question of a mere addition of hydrogen, could not be deduced from this alone.

The artificial charcoals used in the instances mentioned are either obtained by carbonizing organic substances, such as wood, animal waste and the like, at a high temperature, or by activating coals by means of oxidizing gases, such as carbon dioxide or steam, also at a high temperature. In comparison therewith residual coal represents an unattackable, unhydrogenatable residue from natural coal, which remains unattackable in Bergius' process and concerning the catalytic properties of which nothing has either been known or could be foreseen, because at present it is not possible on the basis of available data to gain any insight into the structure of the coal molecule or the mechanism of the pressure heat treatment of coal, such as is effected by the Bergius process, since this is a destructive or cracking hydrogenation, and this reaction proceeds quite indistinctly and non-uniformly. The observation that this residual coal, the obtaining of which has nothing in common with the usual manufacture of artificial porous or active charcoal, has catalytic properties, is original and perfectly new.

It must also not be overlooked that in the above-mentioned cases, for instance in the French Patent No. 620,735 and in British Patent No. 247,587, it is a question of promoting the destructive or cracking hydrogenation reaction by addition of porous or active charcoal, i. e. not of the catalytic action of these latter in a true reducing process, but of a splitting, combined with the absorption of hydrogen, of the initial material into smaller molecular portions.

French Patent No. 629,838 describes the use of porous or active carbon for methods which are connected with dehydrogenation, i. e. a process which effects exactly the opposite to what is aimed at by the present application.

The use of active charcoal, described in the French Patent No. 624,285, for the purpose of obtaining stable and saturated oils, also cannot be compared in any way with the catalytic action of residual coal, because in the first case it is a question of a combined and simultaneous action, unclear in a chemical respect, of purifying substances of the most varied kind, metallic catalysts and active carbon, on the oil vapours which are caused to react in the current of hydrogen under ordinary pressure.

Finally the property of animal charcoal, mentioned in German Patent 324,861 of Class 12o, of purifying crude naphthalene in such a way that it can be catalytically hydrogenated, does not give any indication of the behaviour of residual coal, which moreover has nothing in common with animal charcoal. The animal charcoal referred to in the said German patent together with other purifying masses does not serve as catalyst in hydrogenation, but for eliminating certain catalyst poisons, such as occur in crude naphthalene.

*Example I*

300 kgs. pressed crude naphthalene are heated with 150 kgs. of the residual coal which remains when coals of all kinds are liquefied by the Bergius' process, in a high pressure autoclave, provided with a stirrer, in the presence of compressed hydrogen at an initial pressure of 110 atms. for three hours at 420-425° C., if necessary renewing the hydrogen used up. After cooling the reaction product consists of a thinly liquid oil, which is separated from the unchanged residual coal by filtration or distillation by means of steam. Judging from its boiling point and properties it proves to be a product consisting of hydrogenated naphthalenes, of specific gravity 0.955; yield almost quantitative.

*Example II*

250 kgs. low temperature tar benzene (specific gravity 0.858, boiling point 118-228° C.) containing about 35-40% unsaturated compounds, which when shaken with concentrated sulphuric acid, while becoming strongly heated and resinifying, turns deep dark red, is, as in Example I, heated in an autoclave, provided with a stirrer, with 100 kgs. of the residual coal obtained as under Example I, in the presence of compressed hydrogen (initial pressure 110 atms.) for three hours to 350° C. After cooling the hydrogenated benzene is separated by filtration or distillation from the unchanged residual coal. In such a case it is obtained as an easily liquefiable oil of specific gravity 0.860 and a boiling point of 115-230° C. When shaken with concentrated sulphuric acid, it becomes only slightly heated and only gives a yellowish tint with the acid. The yield is almost quantitative.

What I claim is:—

1. In the non-cracking catalytic hydrogenation of hydrocarbon substances, by means of hydrogen of at least 20 atm. pressure at temperatures of about 350-425° C., the use as catalyst of the undistillable residue, insoluble in organic solvents and unattackable by hydrogen, which remains when coal of any variety is subjected to a splitting hydrogenation in presence of hydrogen under pressure.

2. A method of catalytically hydrogenating a substance selected from the group consisting of naphthalene and low temperature tar benzene, consisting in heating the selected substance in a confined space at a temperature between 350° and 425° C. in presence of hydrogen under a pressure of at least 20 atm. and a catalyst consisting of the undistillable residue, insoluble in organic solvents and unattackable by hydrogen, which remains when coal is subjected to splitting hydrogenation in presence of hydrogen under pressure, and separating the resulting hydrogenated product from the unchanged catalyst.

HANS KAFFER.